L. B. THOMAS.
APPARATUS FOR MEASURING AND DISPENSING LIQUID.
APPLICATION FILED OCT. 5, 1917.
1,289,304.
Patented Dec. 31, 1918.
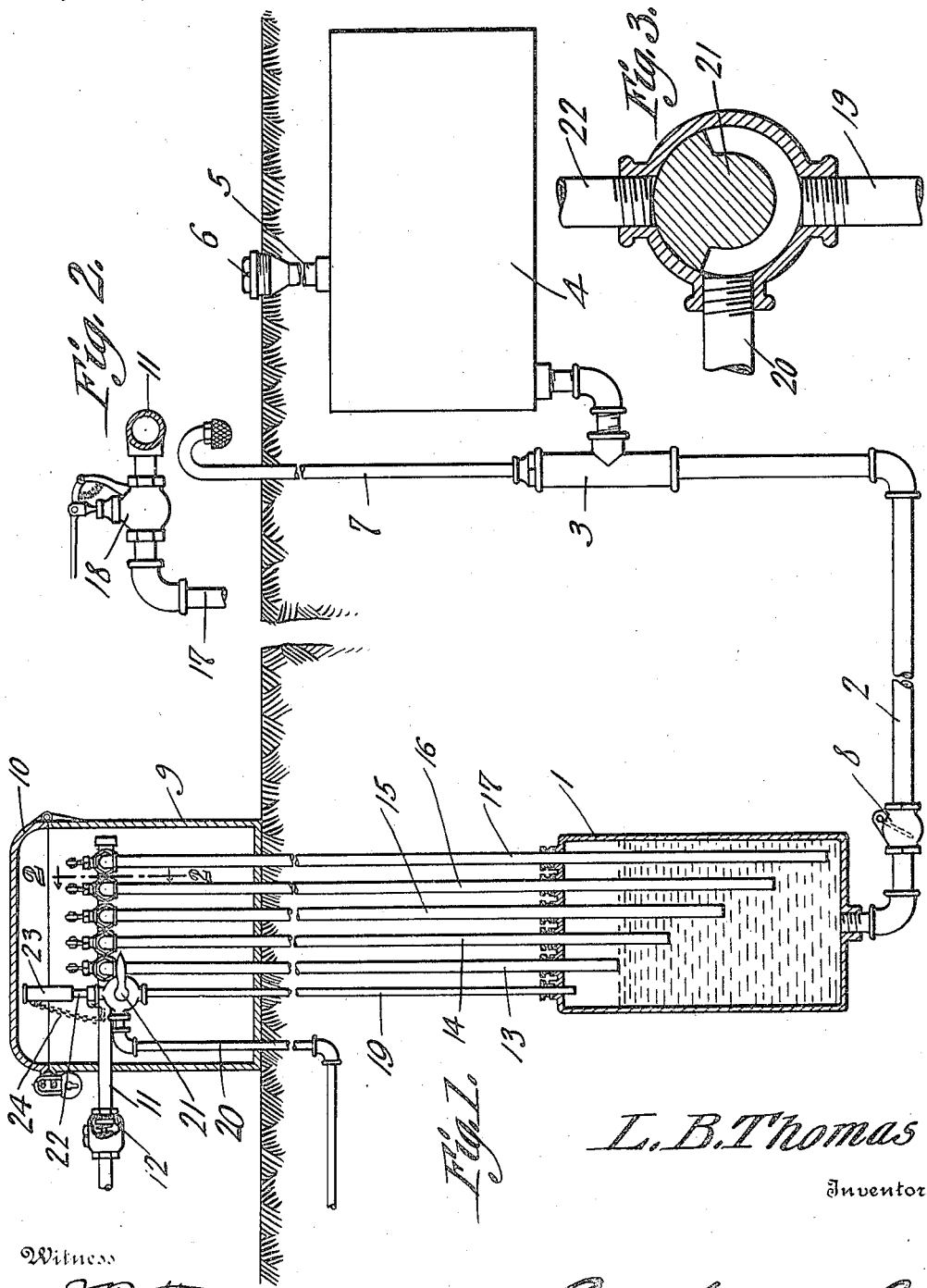
L. B. Thomas
Inventor

UNITED STATES PATENT OFFICE.

LUTHER B. THOMAS, OF SHREVEPORT, LOUISIANA.

APPARATUS FOR MEASURING AND DISPENSING LIQUID.

1,289,304. Specification of Letters Patent. Patented Dec. 31, 1918.

Application filed October 5, 1917. Serial No. 194,943.

*To all whom it may concern:*

Be it known that I, LUTHER B. THOMAS, a citizen of the United States, residing at Shreveport, in the county of Caddo and State of Louisiana, have invented a new and useful Apparatus for Measuring and Dispensing Liquid, of which the following is a specification.

This invention relates to apparatus for measuring and dispensing liquid and is designed primarily as a means for dispensing gasolene.

One of the objects of the invention is to provide means whereby air under pressure can be used for elevating and discharging the liquid from a measuring tank, selective means being used whereby predetermined quantities of the liquid can be discharged.

A further object is to provide apparatus of this character which does not require the use of pistons or other mechanism likely to leak or get out of order.

Another object is to provide apparatus of this character which is cheap to manufacture, easy to install and can be operated readily.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—

Figure 1 is a view partly in section and partly in elevation of the apparatus constituting the present invention.

Fig. 2 is an enlarged section on line 2—2, Fig. 1.

Fig. 3 is an enlarged section through the pressure controlling valve.

Referring to the figures by characters of reference 1 designates a measuring tank and opening into the bottom of this tank is a supply pipe 2 extending from the bottom of a T-coupling 3 one arm of which is connected to the bottom of a supply tank 4 which is preferably arranged underground but above the level of the measuring tank 1. The supply tank 4 has a feed tube 5 opening in the top thereof and extending to the surface of the ground, this feed tube being provided with a suitable closure 6. An air supply pipe 7 is extended from the top of the T-coupling 3 to a point above the ground to permit the free passage of air during the filling and emptying of the supply tank. A check valve 8 is arranged within the pipe 2 and adapted to prevent the contents of the tank 1 from draining downwardly during the removal of liquid from the measuring tank.

Arranged above the surface of the ground and preferably over the measuring tank 1 is a housing 9 which can be provided with a movable cover 10. Extending from this housing is an outlet pipe 11 having a spring pressed check valve 12 and adapted to supply gasolene to the tank of an automobile. Opening in this pipe 11 is a series of elevating pipes 13, 14, 15, 16 and 17 which extend downwardly through the top of the measuring tank 1. All of these pipes are open at their lower ends and the pipe 17 has its lower end supported close to the bottom of the measuring tank 1. The other pipes terminate at different distances from the bottom and all of the pipes are provided near their upper ends with valves 18 whereby communication between said pipes and the outlet pipe 11 is controlled. A pressure pipe 19 opens into the top of the measuring tank 1 and extends up into the housing 9 where it is connected to a pipe 20 designed to supply air to said pipe under pressure. A three way valve 21 is arranged in the upper portion of the pipe 19 and a vent nozzle 22 extends from the valve casing. Thus when the valve 21 is turned to one position it will close communication between pipes 19 and 20. However, when the valve is turned to another position it will open communication between said pipes so that pressure will be directed into the upper portion of the measuring tank 1 and upon the surface of the liquid contained in said tank. When valve 21 is closed the pipe 19 is placed in communication with the vent 22 so that any air contained in the measuring tank 1 will thus be free to escape. A cap 23 is slidably mounted on nozzle or vent 22 and is limited in its movement by a chain 24 or the like. This cap is adapted to be lifted by escaping air, thus to expose a colored surface on the vent pipe 22, but will promptly gravitate to its lowermost position when the escape of air ceases.

The pipes 13, 14, 15, 16 and 17 are adapted to measure and dispense predetermined quantities of liquid. For example the area between the top of the measuring tank 1 and the bottom of the pipe 13 is such as to hold, in some instances, one gallon. The area between the top of the measuring tank 1 and the bottom of the pipe 14 may be such as to hold two gallons. The amount of liquid above the lower end of the pipe 15 may be three gallons, the amount of the liquid above the lower end of the pipe 16 may be 4 gallons and the entire measuring tank may hold five gallons. Thus it will be seen that when air is directed into the measuring tank 1 through the pipe 19 and one of the valves 18 is opened, all of the liquid above the lower end of the pipe controlled by said valve will be forced into the pipe and elevated into the pipe 11. Should it be desired to draw three gallons, it would be necessary first to open the valve 18 at the upper end of the pipe 15. The valve 21 should then be shifted so as to establish communication between the pipes 19 and 20. This would cause the air to enter the upper end of the tank 1 and push downwardly on the surface of the contents of the tank, thus forcing the contents outwardly through the pipe 15 until the level of the liquid arrives below the lower end of said pipe whereupon the air would enter the pipe 15 and flow upwardly and outwardly driving therefrom any liquid contained therein. Valves 18 and 21 could then be closed and the air contained within the tank 1 will escape by way of pipe 19 and vent 22 and will be displaced by a new supply of liquid rising within the tank 1 and supplied from the tank 4 and pipe 2. Obviously during the expulsion of liquid from the measuring tank 1 the valve 8 will be held upon its seat and valve 12 will be opened so that the liquid can only escape by way of the open discharge pipe. As the supply tank 4 is located above the level of the measuring tank 1, a new supply of liquid will always be fed to the measuring tank by gravity, the liquid in the tank being displaced by air flowing downwardly in pipe 7, along the upper portion of the horizontal branch of the T-coupling and thence into the tank. During the filling of tank 1 air, in escaping from the pipe 22 will lift the cap 23 and, when the cap drops, it will be known that the tank is filled.

Apparatus such as herein described has been found to be very accurate in measuring and is advantageous because it has no complicated mechanism, is cheap to manufacture, can be readily installed, and is easily operated.

What is claimed is:—

1. An apparatus of the class described including a measuring tank, means for supplying liquid by gravity to the tank to maintain the tank normally full, outlet pipes extending downwardly into the tank and terminating at different distances from the bottom thereof, means for directing pressure onto the contents of the tank, a valve for controlling said means, there being a vent controlled by the valve, and valves for closing the pipes.

2. The combination with a measuring tank and means for supplying liquid by gravity to the measuring tank to hold said tank normally full, of a discharge pipe, elevating pipes opening into the discharge pipe and extending downwardly into the measuring tank, the lower open ends of the elevating pipes being located at different distances from the bottom of the tank, valves for controlling the flow of liquid through said pipes to the discharge pipe, and valved means for directing pressure onto the contents of the tank.

3. An apparatus of the class described including a measuring tank, means for supplying liquid by gravity to the tank to maintain the tank normally full, outlet pipes extending downwardly into the tank and terminating at different distances from the bottom thereof, means for directing pressure onto the contents of the tank, a valve for controlling said means, there being a vent controlled by the valve, and valves for closing the pipes, and means upon the vent pipe for indicating when the measuring tank is full.

4. An apparatus of the class described including a measuring tank, means for supplying liquid by gravity to the tank to maintain the tank normally full, outlet pipes extending downwardly into the tank and terminating at different distances from the bottom thereof, means for directing pressure onto the contents of the tank, a valve for controlling said means, there being a vent controlled by the valve, and valves for closing the pipes, and a pressure operated sliding indicator upon the vent for indicating when the measuring tank is full.

In testimony that I claim the foregoing as my own, I have hereto affixed my signature in the presence of two witnesses.

LUTHER B. THOMAS.

Witnesses:
A. D. KEENEY,
J. F. PHILLIPS.